April 7, 1959   J. W. BRUNDAGE   2,880,454
TIRE SHAPING DEVICE
Filed Aug. 31, 1953   4 Sheets-Sheet 1
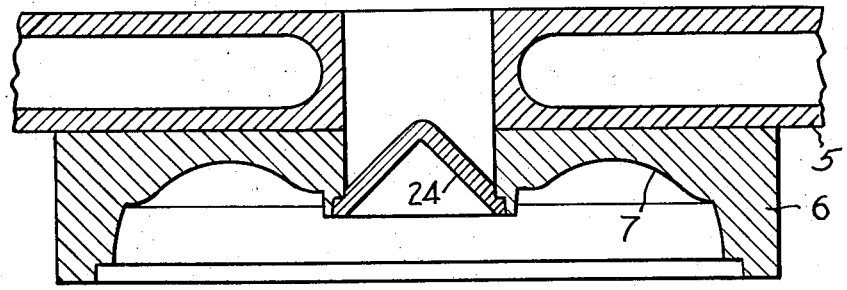
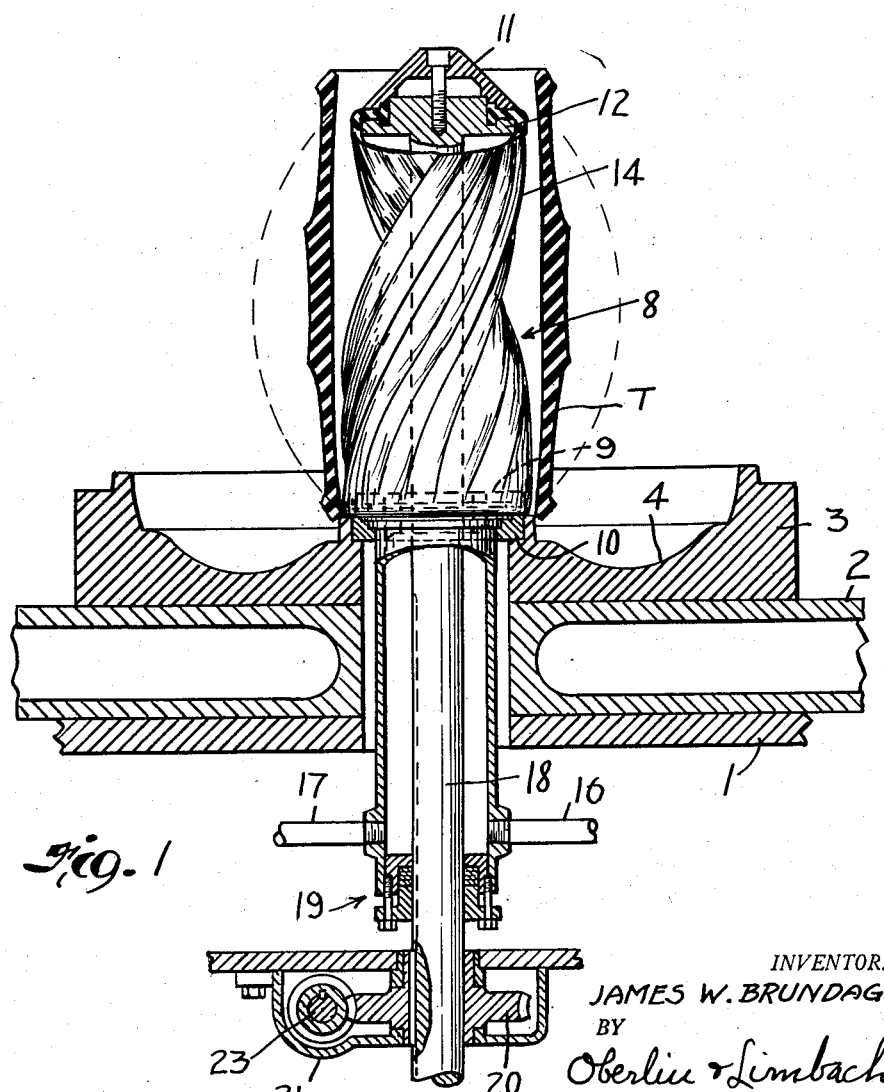
Fig. 1
INVENTOR.
JAMES W. BRUNDAGE
BY
Oberlin & Limbach
ATTORNEYS.

April 7, 1959 J. W. BRUNDAGE 2,880,454
TIRE SHAPING DEVICE
Filed Aug. 31, 1953 4 Sheets-Sheet 2
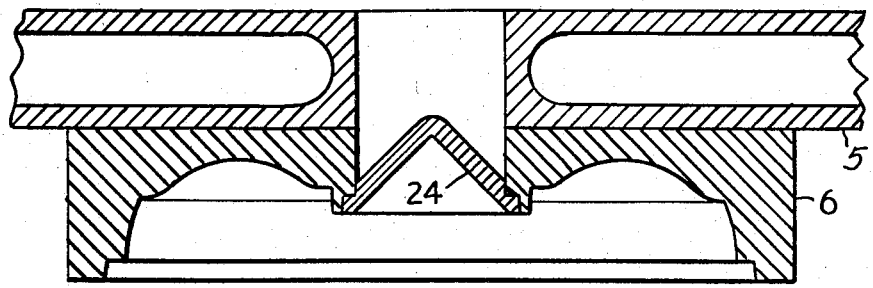
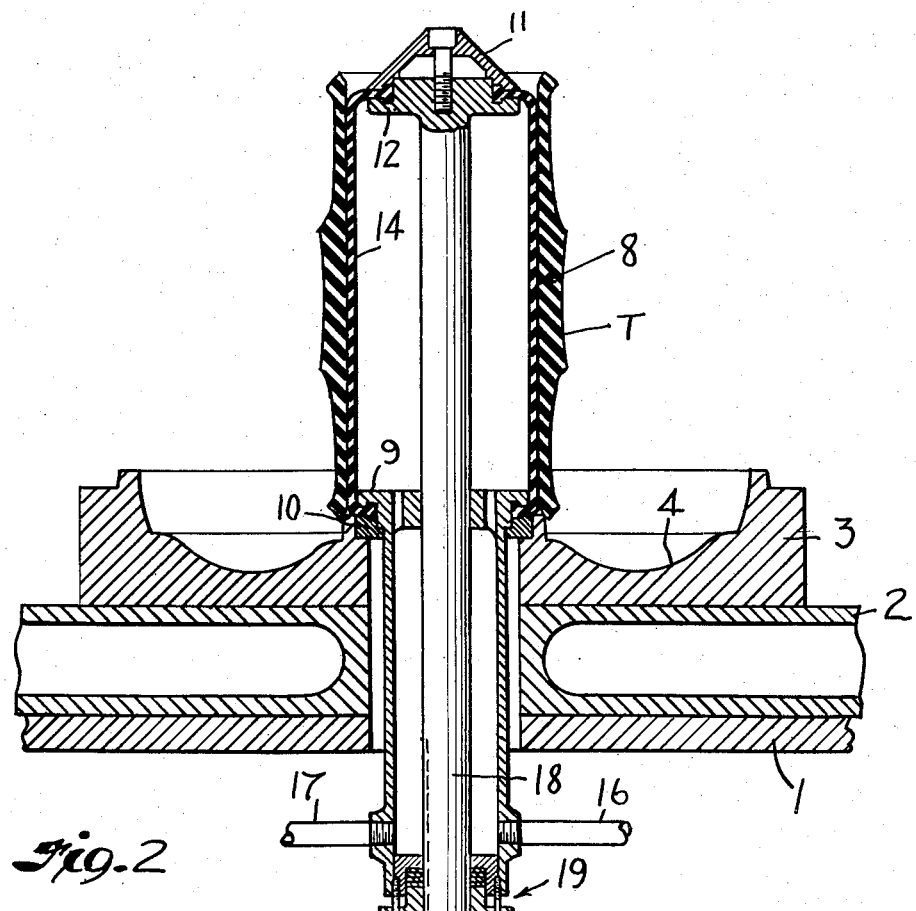
Fig. 2
INVENTOR.
JAMES W. BRUNDAGE
BY
Oberlin & Limbach
ATTORNEYS.

April 7, 1959 J. W. BRUNDAGE 2,880,454
TIRE SHAPING DEVICE
Filed Aug. 31, 1953 4 Sheets-Sheet 3

INVENTOR.
JAMES W. BRUNDAGE
BY
Oberlin & Limbach
ATTORNEYS.

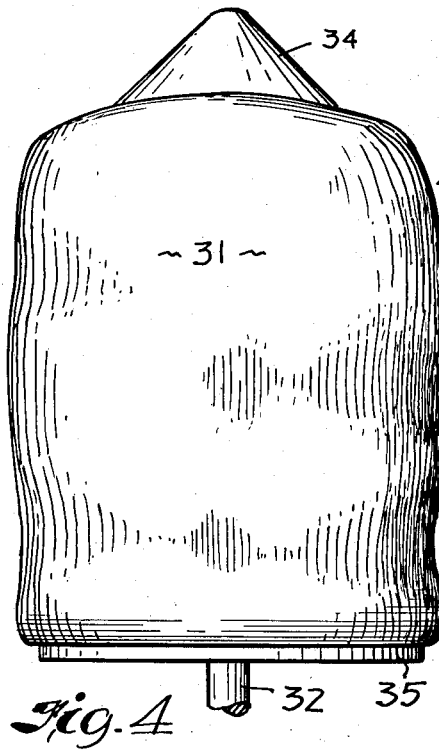
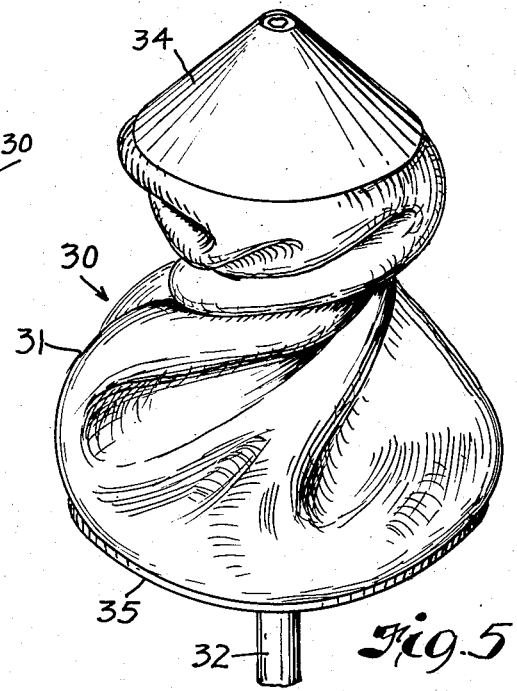
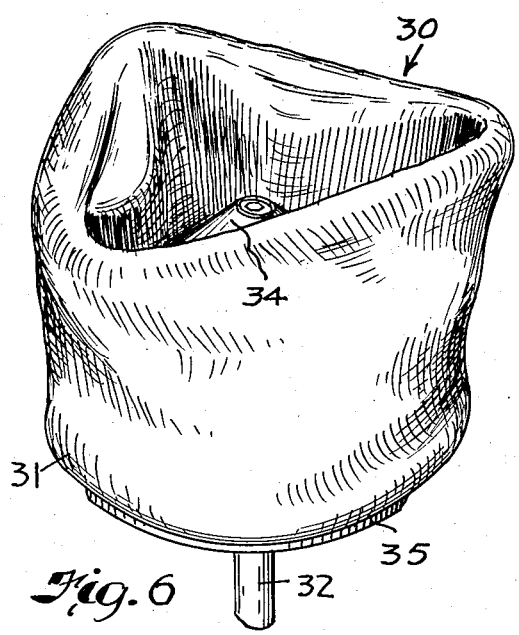
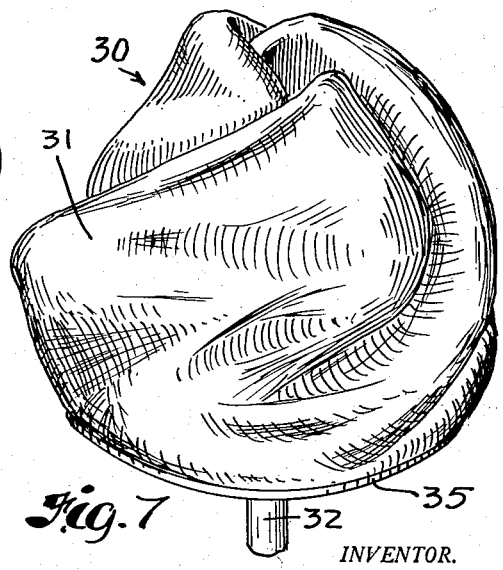

United States Patent Office 2,880,454
Patented Apr. 7, 1959

2,880,454

TIRE SHAPING DEVICE

James W. Brundage, Akron, Ohio

Application August 31, 1953, Serial No. 377,440

17 Claims. (Cl. 18—2)

The present invention, while indicated as relating to a tire shaping device, is, in its broader aspects, concerned with a device for shaping tubular articles by application of outward forces against the inside walls thereof.

It is the present-day practice in the construction of pneumatic tire casings to first build the tire carcass in pulley-band form about a generally cylindrical drum by wrapping a plurality of layers of fabric reinforced ply stock and a layer of tread stock thereon, the ply stock at the ends of said drum being turned-over wire rings to constitute the beads of the finished tire. The carcass thus built is, as aforesaid, of pulley-band or generally cylindrical form and the bead portions usually are of slightly smaller diameter than the main body portion of the carcass. The shaping and vulcanizing or curing of such pulley band tire carcass is effected by moving the beads thereof toward each other by engagement between complementary annular mold sections which, when in mating engagement, define a cavity of tire shape therein; and, as the beads are moving toward each other, applying radial outward force on the inside of the carcass to "belly" the latter progressively as the mold sections approach the closed, mating position. Such radial outward pressure against the tire carcass may be effected as by means of the deformable side wall of a former or shaping device, and when the mold sections are in mating engagement, curing medium may be circulated under pressure through said shaping device to effect vulcanizing or curing of the carcass in finished tire shape, the mold sections at this time also being heated. After the shaped tire has been thus vulcanized or cured, the mold sections are moved to separated position and the shaping device is withdrawn from the finished tire.

In the case of ordinary passenger car tires of size such as 6.00–16, 6.70–15, 7.10–15, 7.60–15, etc., and even large-size truck tires of 20" bead diameter, the ratio of the outside diameter of the finished tire to the bead diameter is about 2:1 or less, and in most instances the diaphragm or deformable side wall of the shaping device is capable of being stretched to this extent during the shaping operation. However, in the case of pneumatic tires for small industrial trucks, small boat trailers, wheelbarrows, and the like, which have bead diameters considerably less than those indicated above, the ratio of the outside diameter of the tire to the bead diameter may be in the vicinity of 3:1, 4:1, and even greater in some instances. For example, in a 5.50–5 tire, the outside diameter of the finished tire is approximately 16" and the bead diameter is only 5", which means that, if the original diameter of the diaphragm is approximately 5" so as to readily receive a 5" diameter pulley-band carcass thereover, the same must be stretched to approximately 15" diameter during the shaping operation. This is a 3:1 ratio of tire diameter to bead diameter, and such severe stretching results in a relatively short diaphragm life, and possibility of rupture thereof.

Another problem encountered in the shaping of these small size industrial tires and also of passenger car and large truck tires and other tires, is that, because the tire shaping device must be of axial length approximately the same as the axial length of the uncured pulley-band carcass, the mold sections must be separated a distance substantially greater than such axial length of the shaping device in order that the uncured carcass can be telescoped around the shaping device. This problem has, of course, been solved by making the tire shaping device wholly or partially retractable from the space between the separated mold sections.

Accordingly, it is a primary object of this invention to provide a novel means for contracting a shaping device to a lateral size smaller than the diameter of the tubular article to be shaped thereby from a normal unstressed lateral size which is substantially larger than the diameter of such tubular article.

Another object of this invention is to provide a novel means for reducing both the axial and radial dimensions of a shaping device to facilitate the loading of articles to be shaped in telescoped relation around said device.

Another object of this invention is to provide a tire shaping device which is of a normal lateral size intermediate the outside diameter and the bead diameter of the finished tire to be shaped thereby and which has operating means associated therewith for contracting the same radially inwardly to a size smaller than the bead diameter of the pulley-band tire carcass and finished tire.

Another object of this invention is to provide a tire shaping device as aforesaid which normally is of axial length approximately the same as that of the pulley-band carcass to be shaped thereby but which is contracted axially preparatory to the loading of the pulley-band tire carcass therearound so that a minimum of lifting of the carcass is entailed, and so that the mold sections need be separated only a relatively short distance greater than the axial dimension of the pulley-band carcass.

Other objects and advantages of the present invention will become apparent as the following description proceeds.

To the accomplishment of the foregoing and related ends, the invention, then, comprises the features hereinafter fully described and particularly pointed out in the claims, the following description and the annexed drawings setting forth in detail certain illustrative embodiments of the invention, these being indicative, however, of but a few of the various ways in which the principle of the invention may be employed.

In said annexed drawings:

Fig. 1 is a fragmentary cross-section view of a tire curing press showing the tire shaping device constituting the present invention in its radially contracted condition for facilitating the loading of a pulley-band carcass therearound, the top mold section of the press being shown in a position below its topmost position;

Fig. 2 is the same as Fig. 1 except that the tire shaping device has been released from its contracted condition of Fig. 1 so as to engage within the pulley-band carcass therearound;

Fig. 4 is a perspective view of a modified form of tire shaping device;

Fig. 5 shows the Fig. 4 tire shaping device in its radially contracted condition as effected by relative rotation of the opposite heads of said device;

Fig. 6 shows the Fig. 4 shaping device in a partly invaginated condition with the top head thereof pulled down against the bottom head;

Figure 8:
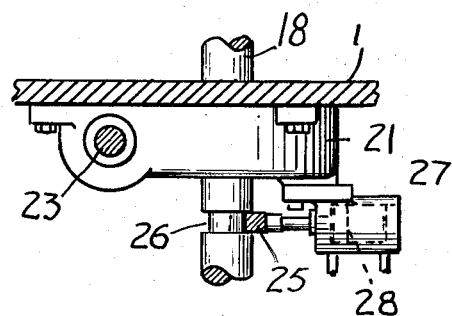

Fig. 7 shows the radially contracted condition when the heads of the partly invaginated shaping device are rotated relative to each other from the position of Fig. 6, the tire shaping device as partly invaginated and twisted in Fig. 7 being of general conoid form except for the pleats or folds resulting from the partial invagination and twisting; and Fig. 8 is a fragmentary side elevation view of mechanism for holding the top and bottom heads of the tire shaping device in predetermined spaced apart relation during relative rotation thereof so that reduction in lateral size is effected not only by the twisting but by the additional stretching due to holding of the heads against movement toward each other during such twisting.

Broadly stated, the present invention, insofar as the apparatus is concerned, comprises a tire shaping device which has a tubular deformable diaphragm extending between the ends thereof, and means for relatively rotating the ends of said device so as to twist said diaphragm to a reduced radial size; and, in another aspect of the invention, the apparatus comprises, in addition to the tire shaping device and twisting means as aforesaid, means for partially invaginating the diaphragm prior to twisting of the same for thus not only reducing the radial size of the device but also for substantially reducing the axial size thereof in its partly invaginated and twisted condition. Insofar as the method is concerned, in one case this involves the step of relatively rotating the ends of a shaping device to thus twist and reduce the radial or lateral size of the diaphragm extending between such ends; and, in another aspect, the method involves the intermediate step of partly invaginating the deformable diaphragm prior to twisting thereof.

Figure 3:
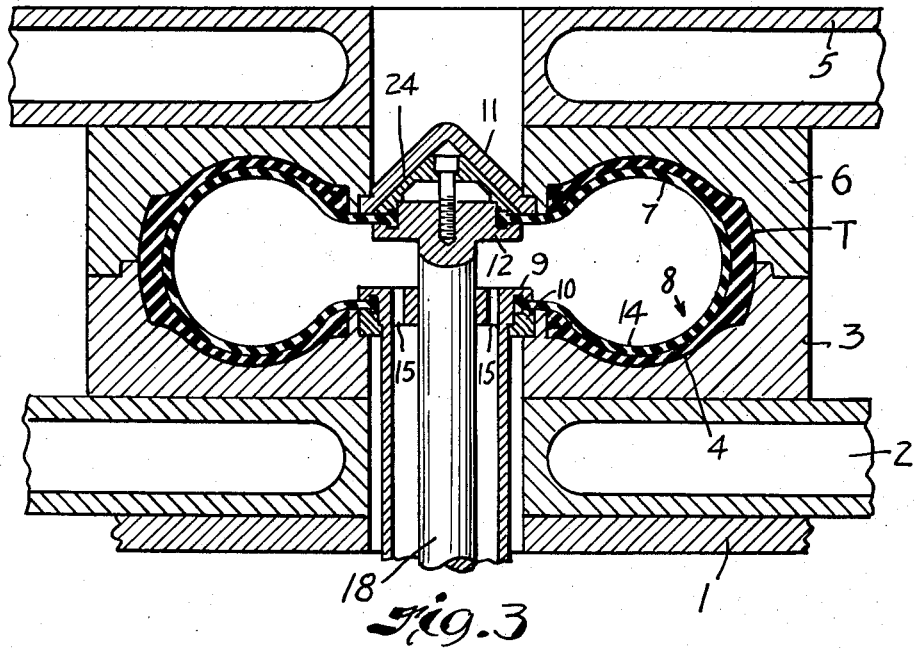
Fig. 3 shows the tire curing press in its closed position with the pulley-band carcass shaped to finished tire form by means of radial pressure applied by the tire shaping device and axial pressure applied by the mold sections against the tire beads.

Referring now more specifically to the drawings, and first to Figs. 1 to 3 thereof, the tire curing press construction, as a whole, may be of any well known form including, for example, a base 1 upon which is mounted a heating platen 2, the latter in turn supporting thereon a bottom mold section 3 which has an annular cavity 4 corresponding to one bead, one side wall, and a portion of the tread of the tire which is to be shaped and cured therein. The press has a movable heating platen 5 to which is secured a top mold section 6 having a cavity 7 therein which defines the other bead, the other side wall, and the remaining tread portion of the tire to be shaped and cured therein. Any suitable means, not shown, such as a crank mechanism, are provided for moving the top mold section 6 from the position shown in Fig. 1 to that shown in Fig. 3, and in the latter position, said top mold section 6 and bottom mold section 3 are in mating engagement to define a tire shaped cavity 4, 7 therebetween. A suitable crank mechanism for so moving said heating platen 5 and said top mold section 6 relative to the bottom mold section 3 is shown and described in my U.S. Patent No. 2,730,763, granted on January 17, 1956.

The tire shaping device indicated by the reference numeral 8 comprises a two-part bottom head 9—10 and a two-part top head 11—12 arranged, as shown, to clamp therebetween the beaded edges of a tubular deformable diaphragm 14.

As previously mentioned, the shaping and vulcanizing of pneumatic tire casings which have outside diameters substantially greater than the bead diameters thereof presents somewhat of a problem with the ordinary form of shaping device diaphragm of normal diameter approximately the same as or slightly less than the inside diameter of the tire beads, because during the shaping operation, said diaphragm must be stretched from such small diameter to a diameter 3 to 4 or more times larger, thus increasing the danger of rupture of the diaphragm and otherwise overstressing the diaphragm so that its life is relatively short. Furthermore, if the diaphragm is thickened to accommodate such severe stretching, then its heat transfer characteristics are correspondingly reduced, whereby the curing cycle is longer and consequently the productivity of the tire curing press is reduced.

In order to solve this problem of severe stretching of the diaphragm during the shaping operation, I have made the diaphragm 14 of a normal size and shape as shown in dot-dash lines in Fig. 1, whereby in the case of 5.50-5 size tires, for example, the diaphragm need only be stretched from a diameter of approximately 10″ to about 15″. As shown in Fig. 1, the diaphragm 14 itself is approximately of barrel or ellipsoidal shape.

Now, with a diaphragm 14 of this relative size, it becomes rather difficult to load the press with a pulley-band carcass, and therefore I provide a novel mechanism and method for reducing the lateral or radial size of said diaphragm so that the pulley-band carcass may be readily slipped thereover in telescoped relation.

In the form of the invention illustrated in Figs. 1, 2, and 3, the part 9 of the bottom head is apertured as at 15 and extends downwardly through the bottom mold section 3, the platen 2, and the base portion 1 for connection with fluid pressure supply and discharge conduits 16 and 17 so that fluid under pressure may be admitted into and circulated through the tire shaping device 8 to "belly" the diaphragm 14 and thus exert radial force on the pulley-band carcass T therearound; and, of course, curing medium is circulated under pressure through said shaping device 8 after the carcass has been shaped to final tire form as shown in Fig. 3. The part 12 of the upper head has a rod 18 extending through diaphragm 14 and through a packing gland assembly 19 at the lower end of the part 9 of the bottom head, said rod being slidably keyed to a worm wheel 20 which is rotatably supported in a housing 21 attached to the base 1 of the press and said worm wheel 20 is rotated in opposite directions as by means of a worm shaft 23. Obviously, said rod 18 may be slidably keyed to any rotating mechanism whether it be composed of spur gears, bevel gears, links, etc.

When the press is open, the rotation of said rod 18 and thus of the top head 11—12 of the shaping device 8 through worm 23 and worm wheel 20, said diaphragm 14 will be twisted and thus reduced in diameter from its normal barrel-shaped form as shown in dot-dash lines. During such twisting, the top head 11—12 will be pulled downwardly with respect to the bottom head 9—10 as permitted by the slidable keying of rod 18 in worm wheel 20 whereby the axial dimension of the shaping device 8 is reduced, in addition to its diameter being reduced as aforesaid. With the diaphragm 14 in this twisted condition and with the press fully open, that is, with the mold section 6 in its topmost position rather than partly moved down as shown in Fig. 1, a pulley-band carcass T can be readily slipped over the shaping device 8 so that the bottom bead engages the bead molding portion of the bottom mold section 3. After the pulley-band carcass T has been positioned over said shaping device 8, rod 18 is rotated in the opposite direction to untwist said diaphragm 14 whereupon the tendency thereof to assume its normal unstressed shape causes the same to engage the inside wall of the surrounding pulley-band carcass T as shown in Fig. 2. With the press in the condition shown in Fig. 2, the top mold section 6 is moved downwardly, and at the time that the bead molding portion of said top mold section engages the top bead of the carcass T, fluid under pressure may be admitted into the shaping device 8 through the supply pipe 16 whereupon, as the beads of the carcass are moved toward each other, the diaphragm 14 exerts radial outward pressure against the carcass to effect a progressive swelling of the carcass to the final tire shape of Fig. 3. The upper head 11—12 of the shaping device 8 is centered with respect to the top mold section 6 by its coniform projection (part 11) engaging in a coniform recess 24 in the top movable portion of the press.

When the press is in the closed condition of Fig. 3, curing medium, that is, hot water or steam, for example, is supplied under pressure into the shaping device through the supply pipe 16, and the heating platens 2 and 5 heat the mold sections so that the shaped carcass T is cured to final tire shape.

It is a preferred practice to treat the bottom mold section 3 with anti-sticking solution so that the vulcanized tire T will remain in the top mold section 6 on opening of the press, and in order to facilitate the stripping of diaphragm 14 from the cured tire, said rod 18 may be pushed upwardly during the opening movement and then rotated to twist the diaphragm 14 to approximately the condition thereof as shown in Fig. 1. The cured tire T can then be discharged from the top mold section 6 by any suitable means, and in some instances a platform is laterally inserted under the cured tire and above the top head 11—12 of the shaping device 8 so that the cured tire may be discharged onto said platform and carried thereby away from between the mold sections 3 and 6.

Again, as previously mentioned, with the diaphragm 14 in the twisted condition, the next pulley-band carcass T may readily be positioned therearound.

Usually it is necessary to relatively rotate the heads 9—10 and 11—12 of the shaping device 8 only a part-turn in order to effect substantial reduction in the diameter of diaphragm 14, that is, between ¼ and ½ turn, for example, although the twisting may be less than ¼ turn or more than ½ turn, if desired or necessary.

In instances where it is necessary to further reduce the diameter of the diaphragm without increased twisting thereof, mechanism such as shown in Fig. 8 may be employed which comprises a key 25 or the like engaging in a groove 26 of rod 18 to maintain the heads of the shaping device 8 in predetermined spaced apart relation during the relative rotation thereof. This prevention of the movement of the heads 9—10 and 11—12 toward each other during relative rotation thereof has the effect of further stretching the diaphragm 14 to a further reduced diameter.

The key 25 may be engaged and disengaged from the aforesaid groove 26 in said rod 18 as by means of a pneumatic cylinder 27, the key being connected, for example, to the piston 28 of said cylinder.

In Figs. 4 and 5 are shown the normal and twisted conditions of a tire shaping device 30, and of course the diaphragm 31 can be of normal barrel shape as in Fig. 1, rather than substantially cylindrical as in Fig. 4. When the rod 32 and thus the top head 34, to which said rod is connected, is rotated with respect to the bottom heads 35 a half turn or so, the diaphragm 31 will be twisted as shown in Fig. 5; and because the top head 34 is smaller than the bottom head 35, the twisted condition of the shaping device 30 will be of somewhat conical form and the axial dimension will have been reduced as compared with the axial dimension in Fig. 4 when the heads 34 and 35 are able to move toward each other during relative rotation.

In Figs. 6 and 7, there is shown a modification wherein the rod 32 is first pulled down to pull the top head 34 down toward or against the bottom head 35, thus partially invaginating the diaphragm 31, as best shown in Fig. 6. The partially invaginated diaphragm 31 is then twisted to generally conoid form as shown in Fig. 7, by relatively rotating the rod 32 and top head 34 with respect to the bottom head 35. In this case, the axial dimension of the shaping device will have been reduced to about one-half of the original axial dimension of the device 30 when head 34 is pulled down against head 35; and, because of the generally conoid shape of the invaginated and twisted diaphragm 31, a pulley-band carcass T may easily be positioned thereover, whereupon the shaping device may be untwisted and the top head 34 moved upwardly to un-invaginate the diaphragm 31 so as to be positioned opposite the inside wall of the carcass. At this stage of the operation, the shaping and curing progresses as previously described.

It is to be understood that, although the invention has herein been illustrated and described with reference to shaping and curing of pneumatic tire carcasses, it may be employed in other fields of endeavor for shaping various tubular articles through the expedient of radial outward pressure applied against the inside walls thereof.

Other modes of applying the principle of the invention may be employed, change being made as regards the details described, provided the features stated in any of the following claims, or the equivalent of such, be employed.

I therefore particularly point out and distinctly claim as my invention:

1. In combination, a tire shaping device having ends between which a tubular, deformable diaphragm extends, means for relatively rotating said ends to twist said diaphragm and thus facilitate telescoping of a pulley-band tire carcass therearound, and means for holding said ends in predetermined spaced apart relation during such relative rotation thereof.

2. In combination, a tire shaping device having ends between which a tubular, deformable diaphragm extends, means for moving said ends toward each other to partially invaginate said diaphragm, and means for relatively rotating said ends to twist said partially invaginated diaphragm to a generally conical form to facilitate telescoping of a pulley-band tire carcass therearound.

3. In combination, a tire shaping device having ends between which a tubular, deformable diaphragm extends, a rod connected to one of said ends and extending through the other of said ends, and means for relatively rotating said rod and said other end to relatively rotate said ends and thus to twist said ends relative to each other and thereby twist said diaphragm to radially contracted position to receive therearound a pulley-band tire carcass.

4. In combination, a tire shaping device having ends between which a tubular, deformable diaphragm extends, a rod connected to one of said ends and extending through the other of said ends, and means for relatively rotating said rod and said other end to relatively rotate said ends and thus to twist said ends relative to each other and thereby twist said diaphragm to radially contracted position to receive therearound a pulley-band tire carcass, said means having a non-rotatable, axial sliding connection with said rod whereby, during such relative rotation of said ends, the latter are moved to reduce the end-to-end dimension of said shaping device.

5. In combination, a tire shaping device having ends between which a tubular, deformable diaphragm extends, a rod connected to one of said ends and extending through the other of said ends, and means for axially moving said rod in a direction to move said one end toward said other end to partly invaginate said diaphragm, and means for rotating said rod, and thus said one end, relative to said other end to twist said partly invaginated diaphragm to generally conical form to facilitate loading of an uncured tire carcass thereover.

6. In a tire shaping and vulcanizing apparatus, the combination of a pair of complementary mold sections defining, when in mating engagement, a cavity of tire shape therebetween; means for relatively moving said mold sections from separated position to mating engagement; a tire shaping device carried by one mold section and extending toward the other mold section; said device having ends and a deformable side wall which is of a normal lateral size larger than the smallest diameter of the cavity; and means for twisting said side wall to reduce its lateral size to facilitate telescoping of an uncured tire carcass therearound and in between the separated mold sections.

7. The apparatus of claim 6 wherein said last-named means untwists said side wall after a tire carcass has been telescoped therearound; and wherein means are provided for progressively radially outwardly deforming said side wall against the tire carcass as said mold sections, engaged with the ends of the tire carcass, are moved toward mating engagement to thus progressively deform the tire carcass to tire shape between said mold sections.

8. The apparatus of claim 6 wherein a rod is connected to one end of said device and extends through the other end thereof, and said last-named means rotates said rod to relatively rotate the ends of said shaping device and thus to twist said side wall.

9. The apparatus of claim 6 wherein means are provided for holding said ends against relative movement toward each other during such twisting.

10. The apparatus of claim 6 wherein means are provided to move said ends toward each other to partly invaginate said side wall whereby upon twisting of the latter it assumes a generally conical form.

11. In combination, a device for shaping tubular articles therearound, said device having ends between which a tubular, radially outwardly deformable shaping diaphragm extends, said diaphragm being of a normal lateral size larger than the unshaped article to be telescoped therearound to thus reduce the stresses in said diaphragm when deformed, means for moving said ends toward each other to partly invaginate said diaphragm, and means for relatively rotating said ends to twist said partly invaginated diaphragm to a generally conical form to facilitate telescoping of an unshaped article therearound.

12. Apparatus for making tires comprising an upper mold half, a lower mold half, means for relatively moving said mold halves between an open position and a closed position wherein said mold halves are in registry, a first member associated with said lower mold half, a second member mounted in vertically spaced relation with said first member, a curing bag constituted by an elastic diaphragm the edges of which are in sealing relation with said first member and said second member respectively, and means for relatively rotating said first and said second members to promote the contraction and expansion of the curing bag.

13. Apparatus for making tires comprising an upper mold half, a lower mold half, means for moving said mold halves between an open position and a closed position wherein said mold halves are in registry, a first disc mounted in the plane of said lower mold half, a second disc mounted in registry with said first disc in the plane of said upper mold half when in closed position, a curing bag constituted by an elastic diaphragm the edges of which are in sealing relation with said discs, and means for relatively rotating said discs to promote the contraction and expansion of the curing bag.

14. Apparatus for making tires comprising an upper mold half, a lower mold half, means for moving said mold halves between an open position and a closed position wherein said mold halves are in registry, a first disc mounted in the plane of said lower mold half, a second disc mounted in registry with said first disc in the plane of said upper mold half when in closed position, a curing bag constituted by an elastic diaphragm, clamping means holding the edges of said diaphragm in sealing relation with said discs, and means for relatively rotating said discs to promote the contraction and expansion of the curing bag.

15. Apparatus for making tires comprising an upper mold half, a lower mold half, means for moving said mold halves between an open position and a closed position wherein said mold halves are in registry, a first disc mounted in the plane of said lower mold half, a second disc mounted in registry with said first disc in the plane of said upper mold half when in closed position, a curing bag constituted by an elastic diaphragm, clamping means holding the edges of said diaphragm in sealing relation with said discs, a shaft having one end connected with said second disc and its other end projecting through said first disc and terminating at a point below said lower mold half, and means for rotating said shaft to promote the contraction and expansion of the curing bag.

16. Apparatus for making tires comprising an upper mold half, a lower mold half, a cranking arrangement for moving said upper mold half between an open position away from said lower mold half and a closed position wherein said mold halves are in registry, a first disc mounted in the plane of said lower mold half, a second disc mounted in registry with said first disc in the plane of said upper mold half when in closed position, a curing bag constituted by an elastic diaphragm, clamping means holding the edges of said diaphragm in sealing relation with said discs, and means for relatively rotating said discs to promote the contraction and expansion of the curing bag.

17. Apparatus for making tires comprising an upper mold half, a lower mold half, a cranking arrangement for moving said upper mold half between an open position away from said lower mold half and a closed position wherein said mold halves are in registry, a first disc mounted in the plane of said lower mold half, a second disc mounted in registry with said first disc in the plane of said upper mold half when in closed position, a curing bag constituted by an elastic diaphragm, clamping means holding the edges of said diaphragm in sealing relation with said discs, a shaft having one end fixed to said second disc and its other end projecting through said first disc and terminating at a point below said lower mold half, and means for rotating said shaft to promote the contraction and expansion of the curing bag.

References Cited in the file of this patent

UNITED STATES PATENTS

| | | |
|---|---|---|
| 1,730,651 | Flaherty | Oct. 8, 1929 |
| 2,296,800 | Soderquist | Sept. 22, 1942 |
| 2,648,439 | Miller | Aug. 11, 1953 |

FOREIGN PATENTS

| | | |
|---|---|---|
| 459,214 | Canada | Aug. 30, 1949 |